April 21, 1964   J. M. FROH   3,129,924
POST PRESS AND PULLER
Filed April 16, 1962
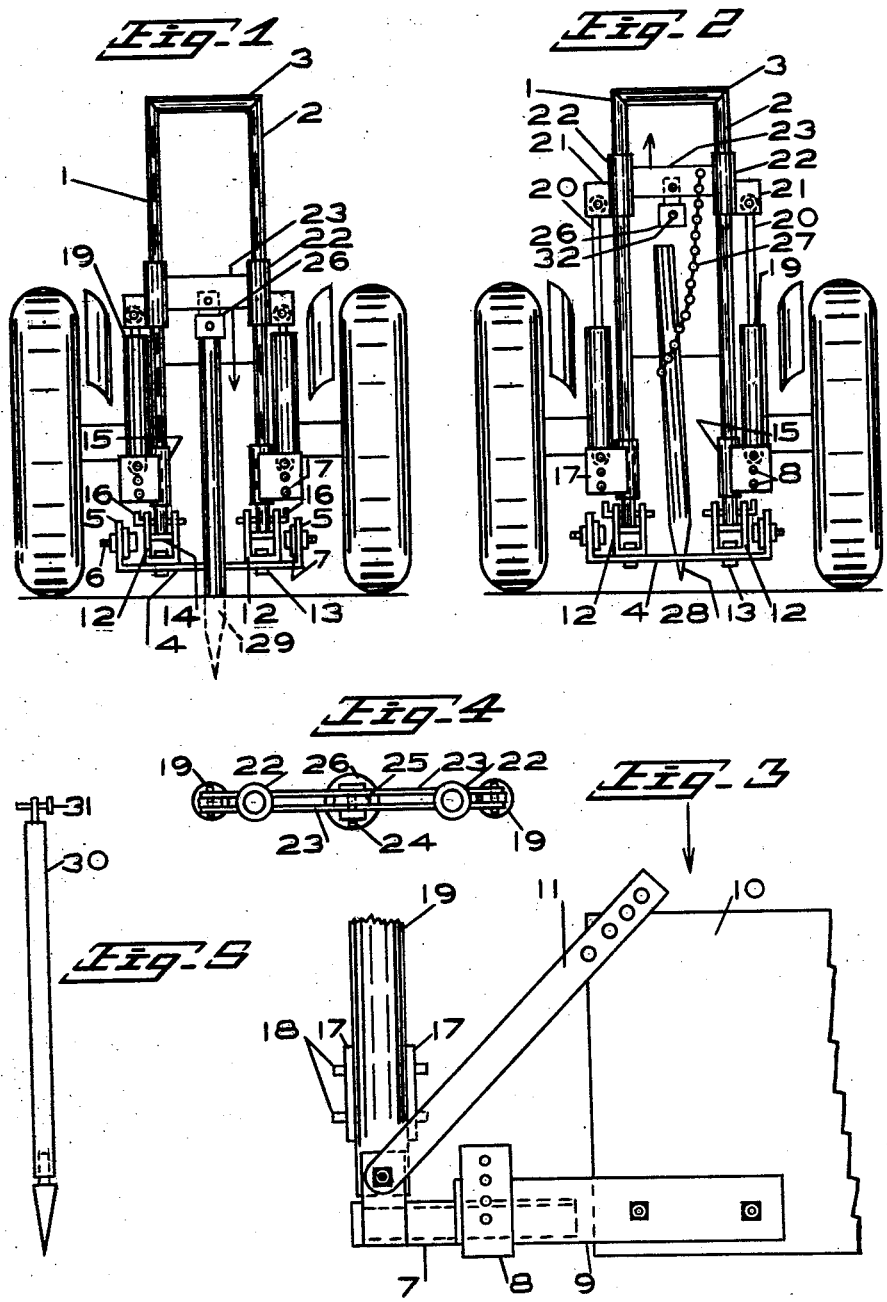

United States Patent Office 3,129,924
Patented Apr. 21, 1964

3,129,924
POST PRESS AND PULLER
John Max Froh, Box 40, Khedive, Saskatchewan, Canada
Filed Apr. 16, 1962, Ser. No. 187,513
1 Claim. (Cl. 254—29)

This invention relates to hydraulic attachments for tractors by which posts may be pressed into or pulled from the ground.

In the art to which the invention relates posts are more usually set in the ground by the use of augers to drill a hole in which the post is placed. This is a slow process and correspondingly costly, requiring as it does, more hand labor in setting and tamping the posts. It has also been proposed to press the posts into the ground by hydraulic means, and it is with this latter type of post setting the present device is concerned.

The within invention consists of an attachment to be carried on a tractor by which a post may be pressed into the ground, or to be used for pulling posts. In this I provide an upstanding frame attachable on the tractor and in which a pair of tubular uprights form guide bars for a hydraulically operated press to be driven from a pump in the tractor. In this frame the guide bars are pivotally mounted at their lower ends on a base and are connected to be pivoted as a unit, so that posts may be driven vertically on sloping ground, and for this the hydraulic elements are carried by the guide bars.

Other features and advantages of the invention will become apparent by reference to the accompanying description taken in conjunction with the drawings.

In the drawings, wherein is illustrated a preferred embodiment of the invention, FIG. 1 is a rear view of a post press and puller in accordance with my invention, shown mounted on a tractor and with the press head in contact with a post in course of being pressed into the ground.

FIG. 2 shows a view similar to that of FIGURE 1, but with the press head elevated and attached by a chain to a post that has been pulled from the ground.

FIG. 3 is a detail enlarged side view of a fragment of a hydraulic cylinder, and including elements for attachment of the cylinder and a frame guide bar to the tractor, a fragment of the body of the latter being indicated and the cylinder shown as broken away.

FIG. 4 is an enlarged top plan view of the post pressing and pulling elements taken by themselves.

FIG. 5 is a side elevation of a punch to be pressed into the ground to make a hole preliminary to pressing the post in.

Having reference to the drawings, the frame for the post pressing and pulling elements consists of two tubular guide bars 1 and 2 with connecting top bar 3. These guide bars are supported on a horizontal base formed by a cross bar 4 that includes upright end tabs 5 attached by bolts 6 to bars 7 that are attachable by bolting to a tractor draw bar cross plate 8 (FIG. 3), which latter attaches by plates 9 to the body 10 of the tractor by any suitable means, and this may be reinforced by diagonal braces, as at 11 in FIGURE 3, attaching to the upright tabs 5 and the body 10. Such an arrangement must necessarily vary to accommodate different makes of tractors, and in addition a large tractor is required.

On the base cross bar 4 are two upstanding U boxes 12 secured to the cross bar by bolts 13, and in these are cross plates 14 on which the lower ends of the guide bars rest, these guide bars pivoting on pins 16 carried in the upper portions of the boxes 12.

On the guide bars 1 and 2 are fixed sleeves 15 to which are attached, as by welding, a pair of plates 17 for each sleeve and in which are secured by pins 18 the lower ends of hydraulic cylinders 19 that are to be connected by suitable couplings to a fluid pump in the tractor. These cylinders would have pistons for reciprocation therein and would include piston rods 20 that connect by lugs 21 to sleeves 22 slidable on the tubular guide bars 1 and 2, the sleeves forming part of the press head for pushing the posts into the ground.

This press head includes plates 23 attached to the sleeves 22 spaced thereby and between which is secured by a pin 24 a stud 25 of a post engaging element in the form of a cap 26 adapted to engage over the post end.

Additionally, pulling the posts is done by use of a chain 27 attached to the plates 23 of the press head, the chain to be looped about the post, such as the post 28 in FIGURE 2.

In the use of the device a sharpened post 20 (FIG. 1) is held in position to be pressed into the ground by the press head urged by the hydraulic elements. This may be done without the need of any preliminary hole in the ground where the moisture content is average, but under extremely dry conditions it is best to make a preliminary hole by the use of an earth punch 30, shown in FIGURE 5, this punch preferably being an inch and a half to two inches in diameter and seven feet long, and it is attachable to the cap 26 by a pin 31 engageable in a suitable opening, as at 32, in the cap.

The press attachment is designed to handle a seven foot post, round and with sharpened point. It has a great advantage over the auger type post mounting in that there is no loose earth about the post to take moisture, and posts pressed into the ground last much longer. The press is capable of handling a post a minute with two men operating it.

Having thus particularly set out the nature of my said invention, what I claim and wish to secure by Letters Patent is:

In a post pressing and pulling attachment for tractors, a supporting base frame, means mounting the base frame fixed on the tractor, a post pressing and pulling frame comprising a pair of tubular guide bars having a top bar connecting the side bars spaced apart, means pivotally mounting the guide bars upstanding on the base frame to move forward and backward thereon, a pair of hydraulic elements, means mounting the hydraulic elements fixed at their lower ends to the side bars, said hydraulic elements including piston rods, a press head mounted movable up and down on the guide bars, means attaching the piston rods to the press head for moving the press head on the guide bars, and a post engaging cap attached depending from the press head.

References Cited in the file of this patent
UNITED STATES PATENTS

| | | |
|---|---|---|
| 1,435,486 | Leon et al. | Nov. 14, 1922 |
| 2,634,092 | Lindquist | Apr. 7, 1953 |
| 2,683,019 | Saunders et al. | July 6, 1954 |
| 2,742,258 | Rosasco | Apr. 17, 1956 |

FOREIGN PATENTS

| | | |
|---|---|---|
| 146,561 | Sweden | Aug. 17, 1954 |